Figure 1:
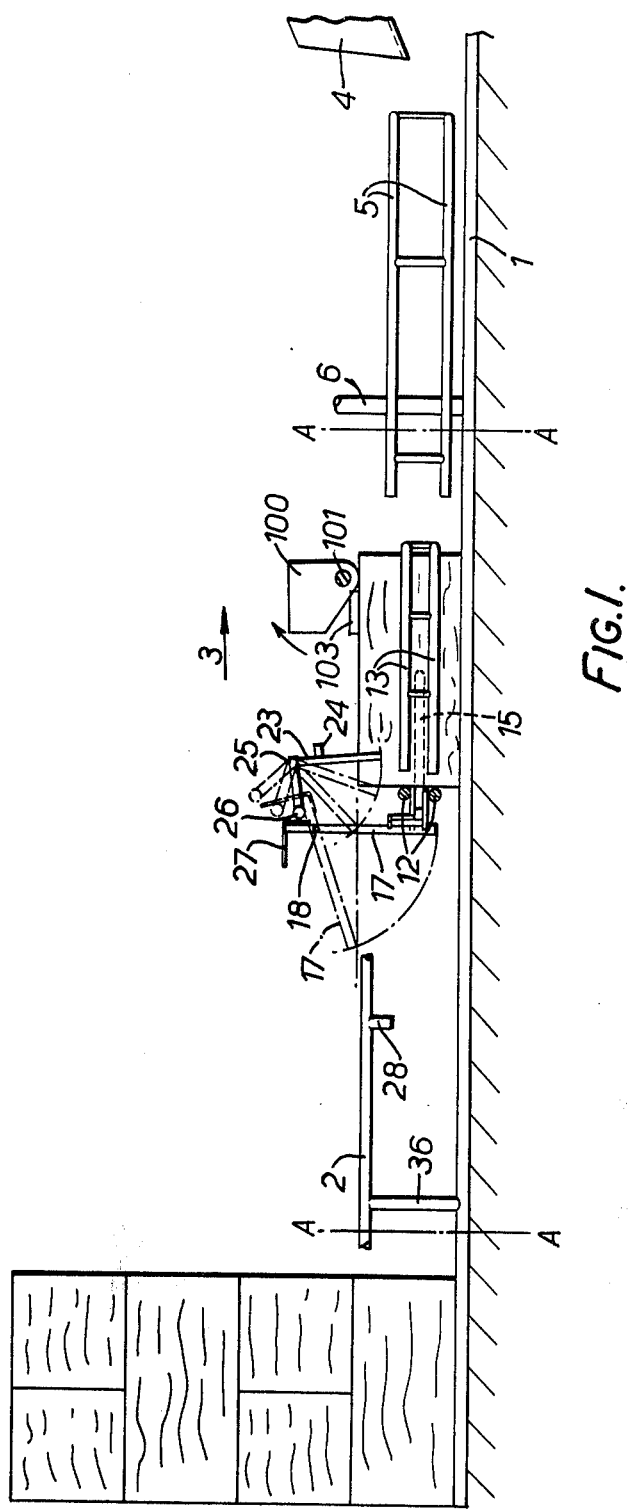

United States Patent [19]
Harber et al.

[11] 3,949,886
[45] Apr. 13, 1976

[54] STACKING OF BALES

[75] Inventors: Gerald Harber; Leslie Albert Young, both of Upton-upon-Severn; Roger Sidney Allard, Worcester; Alan James Marshall, Malmesbury; Michael John Montgomery, Wootton Bassett, all of England

[73] Assignee: British Lely Limited, Swindon, England

[22] Filed: Nov. 18, 1974

[21] Appl. No.: 525,285

[52] U.S. Cl. ............ 214/6 B; 198/31 AC; 214/6 BA
[51] Int. Cl.² ................... A01D 87/12; B65G 57/32
[58] Field of Search ....... 214/6 B, 42 A, 152, 6 BA; 280/8; 198/31 AC; 56/473.5, 474, 475

[56] References Cited
UNITED STATES PATENTS

| | | | |
|---|---|---|---|
| 1,571,880 | 2/1926 | Young | 280/8 |
| 2,709,513 | 5/1955 | Weber et al. | 198/31 AA |
| 2,736,159 | 2/1956 | Marshall | 214/6 B X |
| 3,246,774 | 4/1966 | Bishop | 214/6 B |
| 3,308,971 | 3/1967 | Sinden et al. | 214/6 B |
| 3,499,550 | 3/1970 | Jensen | 214/6 B |
| R26,478 | 10/1968 | Stroup | 214/6 B |

*Primary Examiner*—Robert J. Spar
*Assistant Examiner*—L. J. Paperner
*Attorney, Agent, or Firm*—Haseltine, Lake & Waters

[57] ABSTRACT

A bale stacking implement comprising mechanism for guiding bales into groups and for angularly displacing alternate groups relative to the length of the implement, and comprising mechanism for stacking said groups in their alternate angularly displaced and angularly undisplaced dispositions, the construction and arrangement of the implement being such that, during the operation thereof, at least some of the bales are in contact with the ground during at least part of the formation thereof into said stacks.

15 Claims, 12 Drawing Figures

STACKING OF BALES

This invention relates to the stacking of bales.

According to one aspect of the invention, there is provided a bale stacking implement comprising mechanism for guiding bales into groups and for angularly displacing alternate groups relative to the length of the implement, and comprising mechanism for stacking said groups in their alternate angularly displaced and angularly undisplaced dispositions, the construction and arrangement of the implement being such that, during the operation thereof, at least some of the bales are in contact with the ground during at least part of the formation thereof into said stacks.

According to a second aspect of the invention, there is provided a method of forming stable stacks from groups of bales which method comprises the steps of supplying such groups successively to a bale guiding mechanism, angularly displacing each alternate group of bales with the aid of said guiding mechanism, passing the alternately angularly displaced and angularly undisplaced groups of bales to an elevating mechanism and forming a stack of groups of bales by successively elevating all but the last group of bales of the stack and increasing the size of the stack by supplying the successive angularly displaced and angularly undisplaced groups to the bottom of the stack beneath the previously elevated group(s) thereof, at least some of the bales being in contact with the ground during at least part of the formation thereof into said stack.

Figure 2:
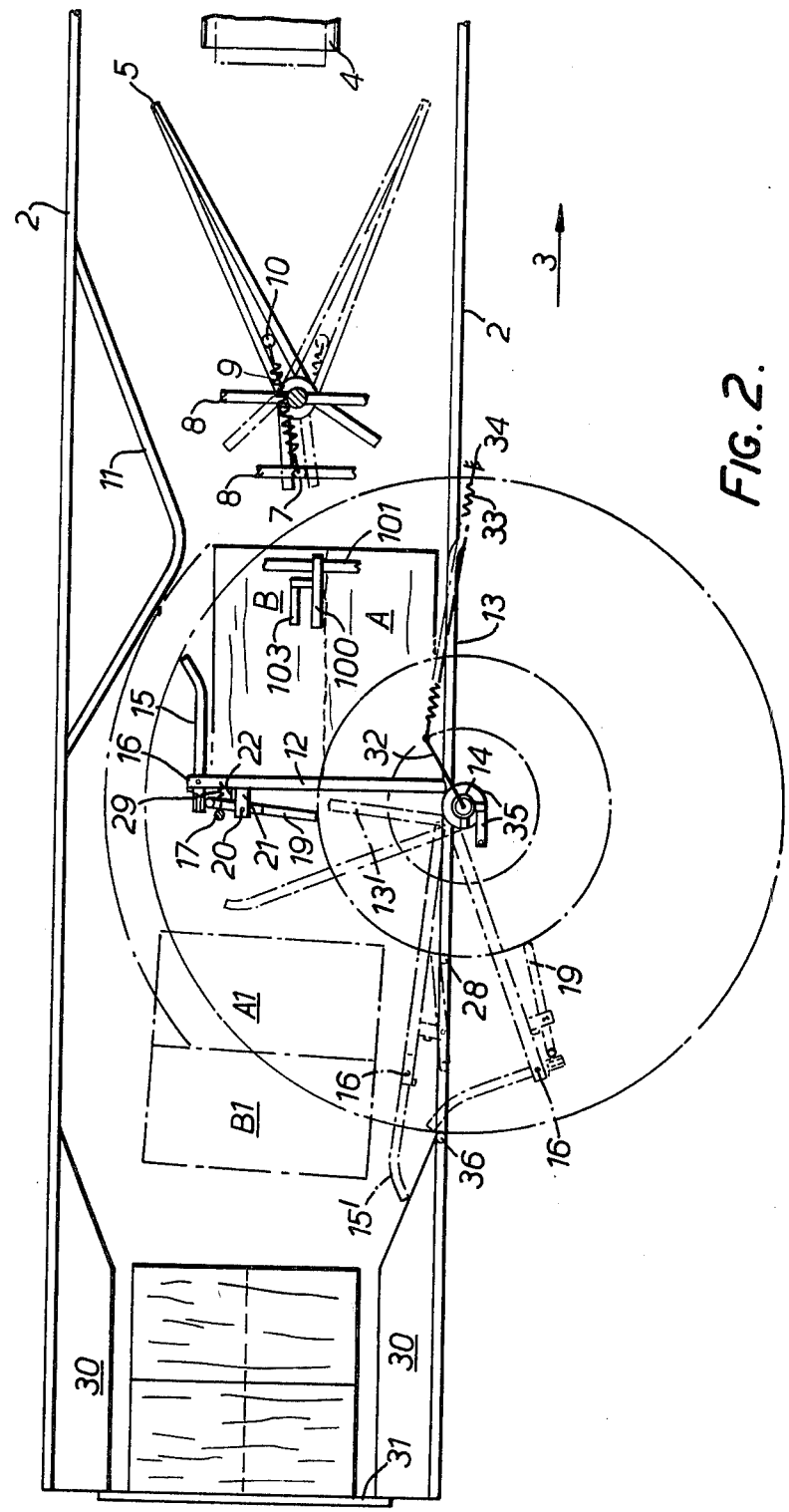
Figures 2A, 2B, 2C:
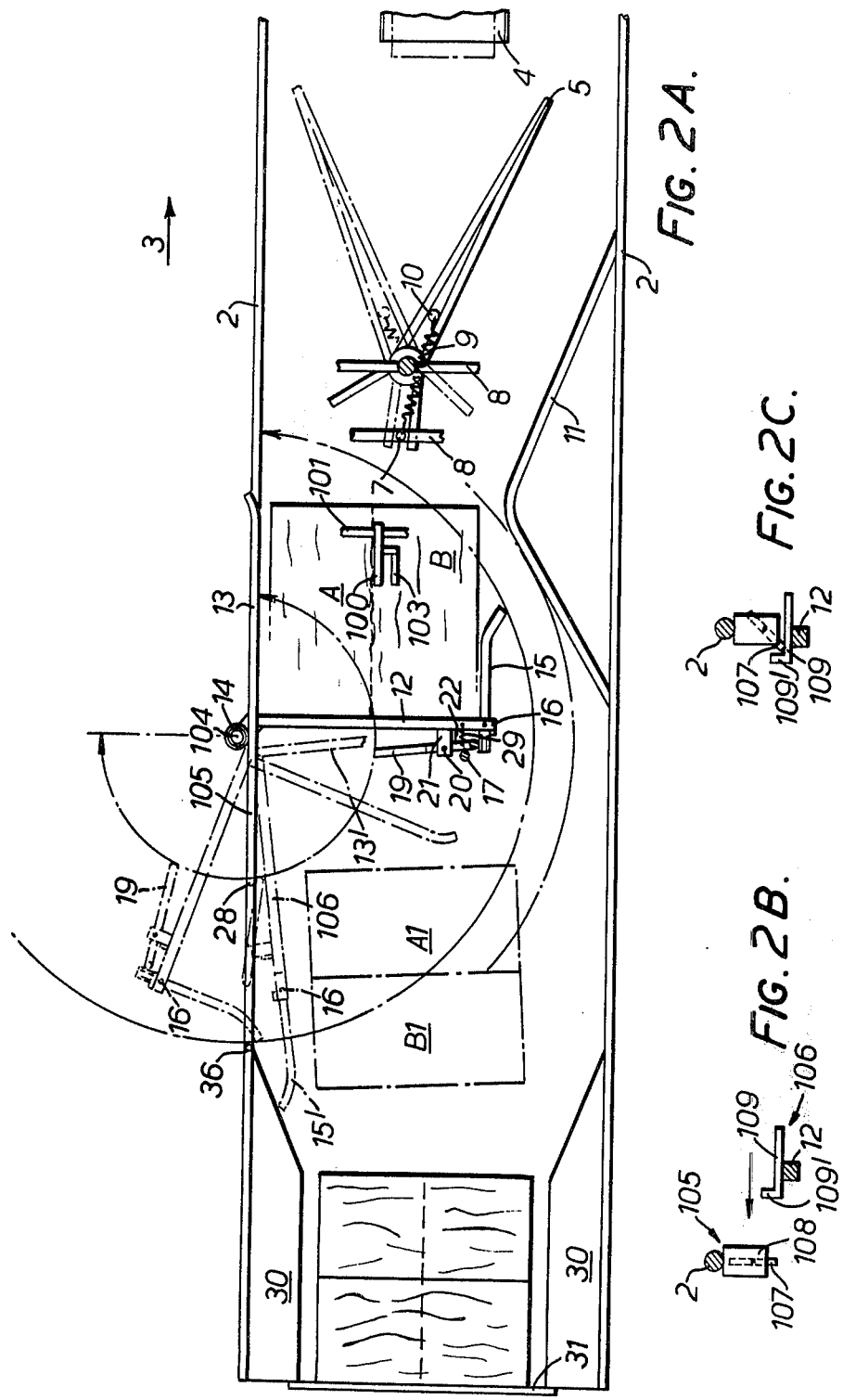
Figure 3:
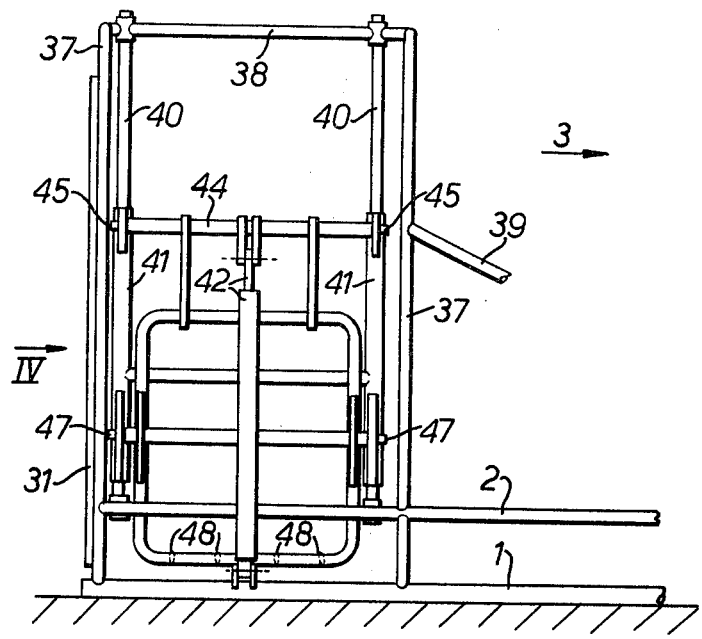
Figures 6, 9:
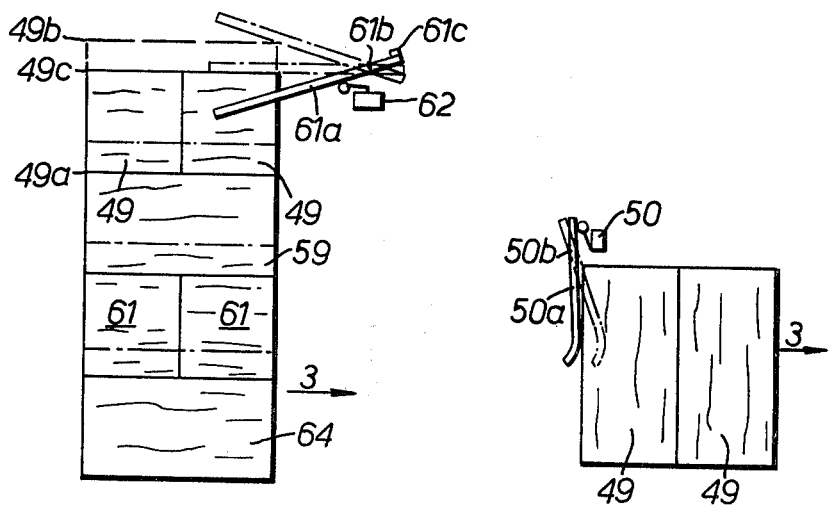
Figure 4:
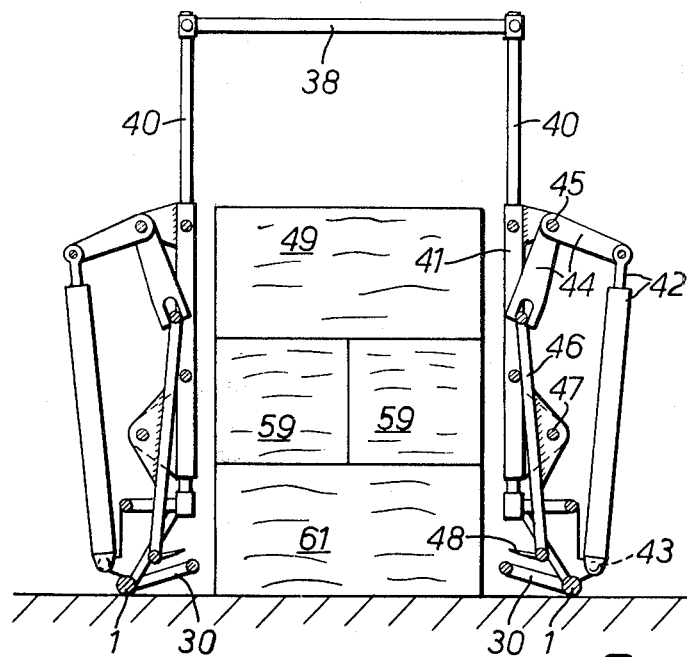
Figure 5:
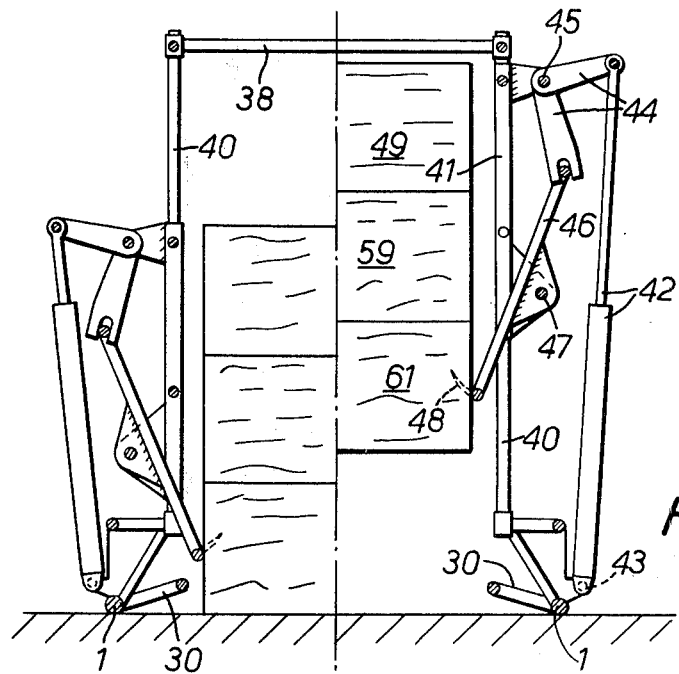
Figure 7:
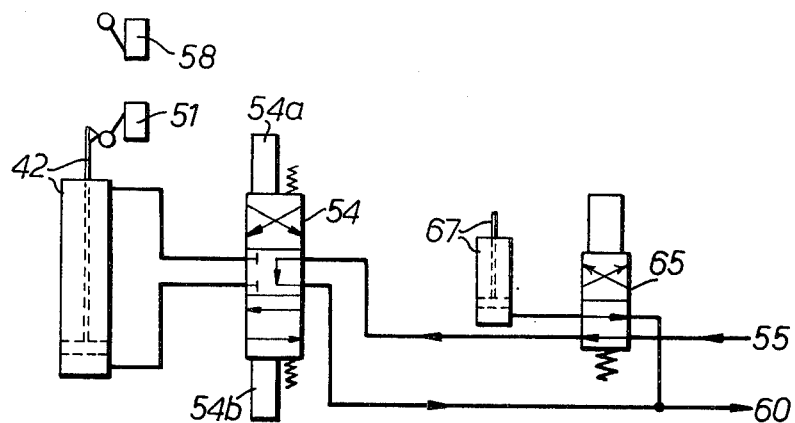
Figure 8:
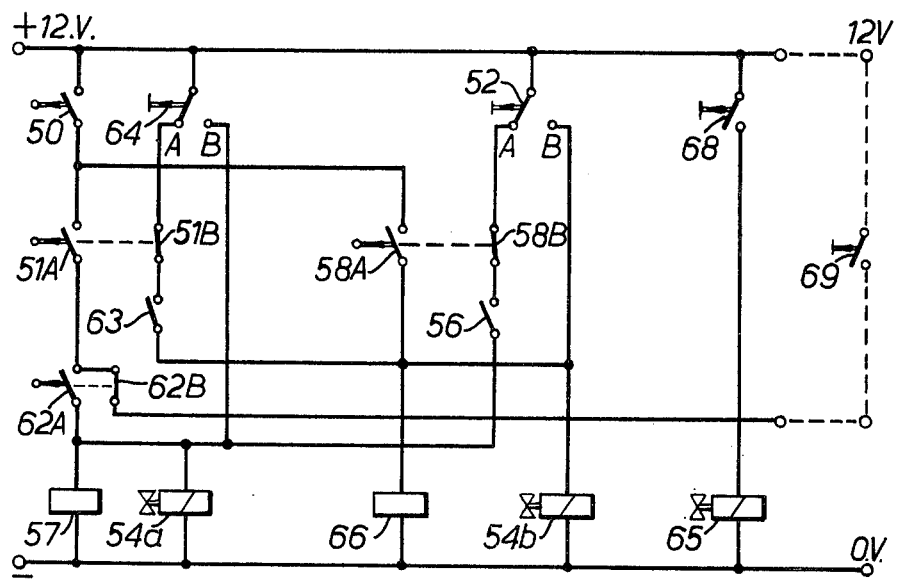

For a better understanding of the invention, and to show how the same may be carried into effect, reference will now be made, by way of example, to the accompanying drawings, in which:

FIG. 1 is a side elevation of a bale stacking implement in the form of a bale sledge, a number of parts of the implement being omitted in this Figure, FIG. 2 is a plan view of the sledge of FIG. 1, again with the omission of certain parts of the sledge, FIG. 2A is a plan view, similar to FIG. 1, of a modified form of implement, FIGS. 2B and 2C illustrate operation of a detail of the implement of FIG. 2A, FIG. 3 is a side elevation of a rear portion of the bale sledge of FIGS. 1 and 2 and illustrates the construction and arrangement of parts that are omitted from FIGS. 1 and 2, FIG. 4 is a rear elevation as seen in the direction indicated by an arrow IV in FIG. 3 but with the omission of a bale retaining door or gate at the rear of the sledge, FIG. 5 corresponds to FIG. 4 and shows a bale elevating mechanism that is visible in both FIGS. 3 and 4, shown in this Figure in two different operating positions, FIG. 6 is a diagrammatic side elevation, to a reduced scale, illustrating the position and function of a switch that is operated during the formation of a stack by the bale sledge, FIG. 7 is a diagram illustrating the relative disposition of further switches and interrelated hydraulic mechanisms of the bale sledge, FIG. 8 is a diagram of the circuit elements by which the formation and release of the bale stacks is controlled during the use of the sledge, and FIG. 9 is a diagrammatic plan view corresponding to FIG. 7 and showing the position and operation of one of the switches shown in FIG. 8.

Referring to the drawings, the bale stacking implement which is illustrated takes the form of a bale sledge having a frame that includes longitudinally extending substantially parallel beams 1 which serve as runners, to make sliding contact with the ground surface during operative travel of the bale sledge, it being intended that the sledge should move over the ground in the direction indicated by an arrow 3 in FIGS. 1, 2, 2A, 3 and 9 of the drawings during its operation. Further longitudinal beams 2 of the frame extend substantially parallel to the corresponding beams 1 at a distance thereabove. The bale sledge which is illustrated in the drawings is intended to be coupled to the rear of a conventional baling machine in order automatically to stack the bales that are delivered from that machine so that they may be left standing in a field in neat, compact and stable stacks for subsequent collection after a curing period. To this end, an inclined bale chute 4 is mounted at the front of the frame with reference to the direction 3 in any convenient manner which it is not necessary to illustrate in the drawings. The leading end (not shown) of the chute 4 is arranged to co-operate with the delivery end of the baling chamber of the associated baling machine in such a way that bales will pass without difficulty from said chamber to said chute 4 even whilst the tractor, baling machine and bale sledge combination is negotiating a tight corner. The chute 4 may, if considered necessary, be turnable through a few degrees relative to the frame of the sledge about a substantially vertical axis located midway between the beams at the opposite sides of said frame to ensure effective co-operation with a baling machine under the circumstances which have just been mentioned. Furthermore, it is preferable that the frame is articulated at the zones referenced A in FIG. 1 to facilitate travel over uneven ground, such articulation preferably being locked when the implement is transported from place to place.

When a bale is pushed from the chute 4 onto the ground by the next bale issuing from the baling machine, it encounters a path-dividing arm 5 that is turnable about a vertical pivot 6 between the limits dictated by a stop 7. Both the pivot 6 and the stop 7 are carried by arched frame beams 8 that extend between the beams 1 and 2 at the opposite sides of the frame. A helical tension spring 9 is stretched between a portion of the stop and an anchorage 10 carried by the arm 5 in such a way that said spring 9 acts as an over-centre spring urging the arm 5 into either the position shown in full lines, or the position shown in broken lines, in FIG. 2 of the drawings.

When a bale falls to the ground surface from the rear end of the chute 4, its weight and the frictional engagement between its bottom surface and the ground will cause it to tend to lie unmoved where it has fallen. However, the sledge, which will normally be drawn over the ground at a speed of about 5 to 8 kilometers per hour (3 to 5 miles per hour) behind the baling machine, continues to advance in the direction 3 so that the bale under consideration is almost immediately contacted by one side of the dividing arm 5 which then occupies the position shown in full lines in FIGS. 2 and 2A of the drawings. The dividing arm 5 displaces the bale laterally towards the right-hand side (with respect to the direction 3) of the frame so that the bale eventually arrives at the position indicated by a reference A in FIG. 2, with a guide fin 100, described below, serving to maintain it in this position. During its passage to the position A, the rear end of the bale with respect to the direction 3 will have contacted the rear of the path-dividing arm 5 and will have caused that arm to turn about the pivot 6 into the alternative position shown in broken lines in FIG. 2, in which position it will be temporarily retained by the spring 9. The next bale that is delivered from the chute 4 will accordingly be directed towards the left (with respect to the direction 3) by the arm 5, rather than towards the right, and will move between that arm and guide bars 11 carried at the left-hand side of the frame into a position which is indicated by the reference B in FIG. 2 of the drawings. As the second bale moves into the position B, it will turn the path-dividing arm 5 back about the pivot 6 into the position shown in full lines in FIG. 2 of the drawings. It will be seen from FIG. 2 that first and second bales occupying the positions A and B are located laterally alongside one another with their rear ends, with respect to the direction 3, in contact with one arm 12 of a bale guiding mechanism. The path-dividing arm 5 thus forms the bales into groups each of which, in this embodiment, comprises two bales.

The bale guiding mechanism which has been mentioned above consists primarily of the substantially horizontally extending arm 12 and of a second substantially horizontal but relatively perpendicular arm 13, the two arms 12 and 13 being rigidly interconnected and being turnable, in common, about an upright pivot 14 located at the right-hand side of the frame with respect to the direction 3. The end of the first mentioned arm 12 that is remote from the pivot 14 carries a bale retaining arm 15 which can be released in the manner which will be described below to turn through approximately 90° about a vertical pivot 16 relative to the arm 12. The arm 12 is retained in the position shown in full lines in FIG. 2 of the drawings, in which it extends substantially perpendicular to the longitudinal beams 1 and 2, by a stop lever 17 turnable about a horizontal pivot 18 (FIG. 1) that is supported by an arched transverse beam or other frame member that is not shown in the drawings. The arm 12 bears against the stop lever 17 through the intermediary of a retaining arm 19 (FIG. 2), a vertical pivot 20 and brackets 21 by which parts said retaining arm 19 is pivotally connected to the first mentioned arm 12 of the bale guiding mechanism. A stop 22 is provided alongside the bracket 21 to prevent the retaining arm 19 from turning in a clockwise direction about the pivot 20 beyond the position thereof that is shown in full lines in FIG. 2 of the drawings.

The guide fin 100 is supported from a frame beam 101 for pivoting about a horizontal axis transverse the length of the frame and so as normally to be disposed, by gravity action, in a lower position not shown in the Figures. When a first bale reaches the position A shown in FIG. 2 of the drawings, it is disposed between the fin 100 in its lower position and a longitudinal beam 2, and it bears against the leading side of the arm 12 so as to be dragged forwards over the ground with the bale sledge because said arm 12 is prevented from turning around the pivot 14 by the stop lever 17. An arm 103 mounted in side-by-side relationship with the fin 100 and fast for pivoting therewith is disposed so as to be contacted by a second bale as this second bale approaches the position B, so that the rearmost end with respect to the direction 3 of this second bale first encounters the arm 103 to swing the fin 100 clear of the bales (in which position it is shown in the Figures), and then encounters one arm of an angular release lever 23 that can be seen in FIG. 1 of the drawings. FIG. 1 shows a bale just approaching the position in which it will first meet the depending arm of the angular release lever 23. It will be noted that the depending arm of the lever 23 bears against a stop 24 to prevent the lever from turning too far in an anticlockwise direction (as seen in FIG. 1) about a horizontal pivot 25 supported by an arched transverse frame beam or other frame member (not shown) to which the stop 24 itself is also connected. A substantially horizontal arm of the angular release lever 23 carries a roller 26 at the end thereof remote from the pivot 25 and this roller bears against an angular abutment plate 27 carried at the upper end of the stop lever 17 above its horizontal pivot 18. As the angular release lever 23 moves forwardly over the ground in the direction 3, its depending arm meets the relatively stationary rear end of a second bale moving into the position B and this bale causes said arm 23 to be turned in a clockwise direction about the pivot 25 as seen in FIG. 1 of the drawings until the roller 26 moves upwardly above the abutment plate 27. It will be seen from FIG. 1 of the drawings that the release lever 23 retains the stop lever 17 in the position shown in full lines in an over-centre manner and a light tension spring (not shown) may, if desired, be provided between said lever 23 and the stop 24 to ensure a correct reset but it has been found that gravity alone is normally quite satisfactory. Once the roller 26 has passes upwardly beyond the abutment plate 27, the ground drag of the two bales bearing against the arm 12 in the positions A and B causes the arms 12 and 13 to turn angularly about the upright pivot 14 pushing the released stop lever 17 into the position shown in broken lines in FIG. 1 of the drawings in which it is turned through an angle of approximately 75° about its pivot 18 as compared with the position thereof that is shown in full lines.

It can be seen from FIG. 2 that the bale retaining arm 15 is maintained in a position in which it extends forwardly in the direction 3 from the free end of the arm 12 by the arm 19 and, accordingly, as the arms 12 and 13 turn about the pivot 14, the two bales in the positions A and B are compelled to turn angularly with them, the fin 100 being held clear by the action of the bales on the arm 103. The turning movement continues through approximately 90° (the fin 100 dropping to its lower position as the bales clear the arm 103) until that end of the arm 19 which is closest to the pivot 14 meets a release stop 28 carried by the beam 2 at the right-hand side of the frame, said release stop 28 acting to turn the arm 19 about its own pivot 20, against the action of a helical tension spring 29, to release the end of the bale retaining arm 15 from its restraining influence. By this time, the two bales will have nearly reached the positions indicated by the references A1 and B1 in FIG. 2 of the drawings. Since ground drag continues to cause said bales to tend to remain in their existing positions, the released bale retaining arm 15 is displaced through approximately 90° about the pivot 16 relative to the arm 12 to bring it to the position indicated in broken lines by the reference 15' in FIG. 2. This effectively frees the two bales from the influence of the arms 12 and 15 so that they are left standing upon the ground to pass between lateral guides 30 at the rear of the frame and into abutting engagement with a bale retaining door or gate 31 whose operation will be further described below together with that of the bale elevating mechanism which is shown in FIGS. 3, 4 and 5 of the drawings.

As two bales occupying the positions A and B turn about the axis of the pivot 14 with the arms 12 and 13 into approximately the positions A1 and B1 shown in FIG. 2 of the drawings, the lower end of the stop lever 17 slides over the upper surface of those two bales until it eventually loses contact with the first bale moving from position A to position A1. Since the lower end of the lever 17 has a much greater mass than the upper end thereof, gravity turns the lever back about the pivot 18 in an anticlockwise direction as seen in FIG. 1 of the drawings to a position beyond the one shown in full lines in the same Figure, it being remembered that the lower end of said lever is not then blocked against such movement by the arm 12 nor by the arm 13 which has not, at that time, yet reached the proximity of the lever 17. As the stop lever 17 performs the movement which has just been described, the abutment plate 27 at its upper end moves progressively away from the pivot 25 so that the angular release lever 23 can fall back into contact with the stop 24 under the action of gravity alone or gravity assisted by the previously mentioned optional return spring. As soon as the lever 23 regains the position shown in full lines in FIG. 1 of the drawings, it prevents the stop lever 17 from turning in a clockwise direction about the pivot 18 beyond the position thereof that is shown in full lines in FIG. 1. The stop lever 17 is thus effectively reset by gravity alone or by gravity with the assistance of a light return spring.

As the arms 12 and 13 are turned about the pivot 14 in the manner which has been described above, a crank 32 (FIG. 2) turns with them and increases the degree of stretch of a long helical tension spring 33 that bears between the free end of the crank and an anchorage 34 occupying a fixed position relative to the frame. A one-way pawl and ratchet mechanism 35 is associated with the pivot 14 and has two teeth that are so arranged that the arms 12 and 13 cannot turn in a clockwise direction as seen in FIG. 2 of the drawings about the pivot 14 from either the position thereof shown in full lines in FIG. 2 or a position in which said arms 12 and 13 have been angularly displaced about the pivot 14 by substantially 90° in an anticlockwise direction. The simple construction of the one-way mechanism 35 which provides this arrangement can be seen in outline in FIG. 2 and its result is that the tensioned spring 33 cannot turn the arms 12 and 13 in the wrong direction when they are not subject to displacement by bales during the use of the bale sledge.

Once the arm 14 has reached the position indicated in broken lines by the reference 13' in FIG. 2 of the drawings, it cannot turn back in a clockwise direction about the pivot 14 as seen in the same Figure due to the arrangement of the one-way mechanism 35 which has just been described. Accordingly, the second of two further bales that are guided into the positions A and B by the path-dividing arm 5 again displaces the depending arm of the angular release lever 23 so that the sequence of events that has previously been described in respect of the displacement of the arms 12 and 13 about the pivot 14 through approximately 90° is repeated except that, this time, it is the arm 13 that is engaged by the two bales. It should be particularly noted that the arm 13 does not carry a retaining arm equivalent to the previously described bale retaining arm 15 so that said bales are not angularly displaced with the arm 13 but merely, in effect, push that arm out of their way. Thus, the two further bales remain substantially in the positions A and B, except that they are laterally displaced to a small extent, and eventually arrive between the lateral guides 30 in substantially the same positions, that is to say, positions in which they are turned through substantially 90° about a vertical axis as compared with the preceding pair of bales. The preceding pair of bales which has just been mentioned will already have been elevated out of the path of the second pair of bales in the manner which will be described in detail below.

As the arm 13 is turned about the pivot 14 by the two further bales which have been mentioned, the arm 12 which is rigidly connected thereto is, of course, also compelled to turn further about the pivot 14. As it does so, the displaced bale retaining arm 15 comes into contact with a re-setting stop 36 at the right-hand side of the frame towards the rear end thereof. The resetting stop 36 turns the bale retaining arm 15 back through slightly more than 90° about the pivot 16 until the arm 19 can move back into over-centre retaining engagement therewith under the action of the spring 29, it being noted from FIG. 2 of the drawings that said arm 19 will by this time have become free of engagement with the release stop 28 due to the continued angular displacement about the pivot 14. The bale retaining arm 15 is thus automatically re-set in its operative position and is automatically retained in that position by the arm 19.

At an instant shortly before the arm 13 becomes free of engagement with the second pair of bales, the spring 33 will have reached its fully tensioned condition in which the anchorage 34, the axis of the pivot 14 and its connection to the crank 32 are in line with one another. Accordingly, the tension spring 33 subsequently acts to turn both arms 12 and 13 through approximately 180° around the pivot 14 in a clockwise direction as seen in FIG. 2 of the drawings and back into nearly the positions thereof that are shown in full lines in that Figure. Actually, the two arms 12 and 13 will not usually return to the position which has just been mentioned under the action of the spring 33 alone but final angular displacement back into that position is effected by the ground drag of the next or fifth bale as it is directed into the position A by the path-dividing arm 5. It will be remembered that the one-way mechanism 35 acts to prevent angular displacement in the wrong direction from the position which has just been mentioned once that position is attained. It will be realised that the fifth bale which has just been mentioned is the first bale of a third pair and that the sequence of events which has been described is automatically repeated in respect of that bale and the sixth bale and a fourth pair represented by the seventh and eighth bales.

Bearing in mind customary harvesting procedures, it can be advantageous to alter the positions of various components to produce a path through the implement for the bales, and with respect to the operative travel direction 3, as follows: first bale to the left, second bale to the right, third bale to the left and so on. FIG. 2A shows an implement so formed, and in which, in addition, a modified form of bale guiding mechanism is provided. Components corresponding to those already described are given the same reference numerals in FIG. 2A and will not be described in detail again. In this form the bale guiding mechanism does not rotate through a full circle, but instead through an arc of only about 180° whereafter it returns through this same arc to its initial position. To this end, the crank 32, spring 33, anchorage 34, and one-way pawl and ratchet mechanism 35 are replaced by a coil spring 104 around the pivot 14 and acting to return the arms 12 and 13 anticlockwise (in FIG. 2A) to their initial position. For retaining the arms 12 and 13 with the arm 13 in the intermediate broken line position 13' there is provided a catch at 105 on one of the longitudinal frame beams 2 that co-operates with a stop at 106 on the arm 12. Referring to FIGS. 2B and 2C, the catch consists of a plate 107 supported between a pair of lugs 108 on the frame beam 2 for pivoting about a horizontal axis. The stop consists of a bar 109 extending horizontally across the top of the arm 12 and having an upturned end 109' that leads as the arm 12 swings towards the catch from its initial position. When the upturned end 109' encounters the plate 107 it initially swings it out of the way so that the plate 107 rides over the upturned end and drops down behind it. The level of the horizontal part of the bar 109 is such as to prevent the plate 107 returning to a fully vertical position, so that the plate adopts an inclined position as shown in FIG. 2C and prevents return movement of the arm 12. Upon subsequent further clockwise movement of the arm 12 brought about by abutment with the next bale, the plate 107 drops off the end of the bar 109 and hangs vertically so that it is free to swing out of the way and not interfere with return movement of the arm 12, which eventually occurs to replace the final 180° of movement of the arms 12 and 13 that takes place in the form of FIGS. 1 and 2.

Turning now to FIGS. 3, 4 and 5 of the drawings, it will be seen that the rear of the frame of the bale sledge is provided with a bale elevating mechanism and that the progressively stacked bales are compelled to travel over the ground with the sledge by the closed door or gate 31 until that gate is released. Uprights 37 interconnected by horizontal frame members 38 are rigidly mounted at the rear end of the frame with respect to the direction 3 and strengthening beams 39 extend between the leading uprights 37 and the longitudinal beams 1 and 2 of the frame at the opposite sides of the latter. Four vertical slideways 40 are supported by the frame parts 37 and 38 in two parallel pairs which lie at opposite sides of the frame and each pair of slideways is associated with a corresponding lifting assembly. As the elevating mechanism includes two symmetrically identical, or substantially identical, lifting assemblies, it is only necessary to describe one of those assemblies in detail. The assembly comprises a framework 41 which is slidable upwardly and downwardly along the corresponding pair of slideways 40 against frictional resistance during the bottom 75% and freely during the top 25% of the length of travel, a centrally mounted hydraulic double-acting piston and cylinder assembly or ram 42 the lower end of whose cylinder is turnable about a horizontal pivot 43 relative to the corresponding frame beam 1, a crank assembly 44 that can be turned about horizontal pivots 45 relative to the corresponding framework 41 by the ram 42 and a rack 46 that is turnable about horizontal pivots 47 relative to a lower end region of the corresponding framework 41. A lower region of each rack 41 is provided with a row of four pointed tines 48 arranged to penetrate into, and grip, the bales which they engage in the use of the bale sledge.

FIGS. 1 to 5 of the drawings do not show any electrical or hydraulic connections to the bale sledge but, in the example which is being described, the bale elevating mechanism at the rear of the sledge is connected to the hydraulic system of the agricultural tractor or other vehicle which operates the co-operating baling machine and to the 12 volt electrical system of the same tractor or other vehicle by way of flexible hydraulic ducts and electric cables which are not shown in FIGS. 1 to 5. The electrical and hydraulic system of the bale sledge is shown diagrammatically in FIGS. 6 to 9 of the drawings to which reference will now be made in conjunction with FIGS. 3 to 5 thereof. At the commencement of a bale stacking operation by the bale sledge, a first pair of bales 49 (FIGS. 6 and 9) reaches the foot of the bale elevating mechanism at the rear of the sledge and engages a spring-loaded arm 50a (FIG. 9) causing it to turn about a vertical pivot 50b mounted on the rear door or gate 31 and to engage with, and operate, a bale probe switch 50 fixed to one of the uprights 37. The contacts 51A of a bottom limit switch 51 (FIGS. 7 and 8) of the rams 42 are closed at this time as are the contacts 62A of a stack switch 62 (FIG. 6). The stack switch 62 is normally maintained in this position by an arm 61a which is turnable about a horizontal pivot 61a fixed to one of the uprights 37. The weight of that part of the arm 61a which extends beyond the stack switch 62 and the pivot 61b is sufficient to operate the stack switch contacts 62A but, as an alternative, the arm 61a could be spring loaded. A stop 61c prevents damage to the stack switch 62 by the arm 61a. A circuit is accordingly made via the contacts of the closed bale probe switch 50 (FIG. 8), contacts 51A of the ram bottom limit switch 51 and the contacts 62A of the stack switch 62, an "up" solenoid 54a (FIGS. 7 and 8) of a three position hydraulic valve 54 and the solenoid of an "up" relay 57 (FIG. 8) causing both the latter to operate. A contact 56 of the "up" relay 57 is simultaneously closed completing an alternative circuit (the up hold circuit) via contacts 52A of a "down" push button 52, contacts 58B of a top limit switch 58 of the rams 42 and the "up" relay contact 56 to the aforementioned solenoids of the valve 54 and the relay 57. The solenoid valve 54 acts to place the cylinders of the two rams 42 in communication with a hydraulic pressure duct 55 and a return or relief duct 60 (FIG. 7) in such a way that the piston rods of the two rams 42 start to rise and the crank assemblies 44 are turned about their pivots 45 with the result that the racks 46 are also turned about their pivots 47 thus displacing the tines 48 inwardly into penetrating engagement with the first pair of bales 49. At this instant in time, both lifting assemblies of the bale elevating mechanism will have reached the position shown at the left-hand side of FIG. 5 in respect of one of those assemblies, except that there will only be one pair of bales present instead of the three pairs shown in FIG. 5. As the piston rods of the rams 42 start to rise, the bottom limit switch 51 is released but the circuit is maintained via the aforementioned "up hold" circuit.

Once the tines 48 have penetrated into the first pair of bales 49 as far as they will go, the crank assemblies 44 can turn no further about their pivots 45 so that the continued extension of the piston rods of the rams 42 causes the frameworks 41 to move upwardly along the slideways 40, the bales 49 being carried upwardly to a similar extent by the tines 48. Elevation of the bales 49 from ground level causes the bale probe switch 50 to be released by the arm 50a which moves back into the broken line position thereof shown in FIG. 9.

When the piston rods of the rams 42 are fully extended, the ram top limit switch 58 is operated thus opening its contacts 58B and breaking the "up hold" circuit. The solenoid 54a of the hydraulic valve 54 is de-energised and the spring-centred spool of that valve then closes off the cylinder connections and connects the hydraulic pressure and return ducts 55 and 60 together to relieve the hydraulic pump. At about this time or slightly later, a second pair of bales 59 arrives at the foot of the bale elevating mechanism beneath the elevated bales 49 and closes the bale probe switch 50 by way of the arm 50a. Since the ram top limit switch is closed, a circuit is accordingly made via the contacts of the bale probe switch 50, the ram top limit switch contacts 58A, a "down" solenoid 54b of the valve 54 and the solenoid of a "down" relay 66 causing both to operate. A contact 63 of the "down" relay 66 is simultaneously closed completing an alternative circuit, "the down hold circuit", via contacts 64A of an "up" push button, the bottom limit switch 51B of the rams 42 and the "down" relay contact 63 to the solenoids of the valve 54 and the "down" relay 66. The solenoid valve 54 acts to place the cylinders of the two rams 42 in communication with the pressure and relief or return ducts 55 and 60 in such a way that the piston rods of the two rams 42 start to retract into their cylinders causing the frameworks 41 to move downwardly along the slideways 40 and release the ram top limit switch 58, the "down hold" circuit still being maintained. The bales 49 carried by the tines 48 of the racks 46 therefore continue to descend until they come to rest upon the relatively perpendicularly disposed second pair of bales 59. The racks 46 then turn about their pivots 47 to withdraw the tines 48 from the bales 49. At about this position of the frameworks 41, a frictional resistance to the movement thereof downwardly along the slideways 40 is engaged to assist in the withdrawal of the tines 48 and to maintain the racks 46 in their open positions, as shown in FIG. 4, during the remainder of the downward travel. When the piston rods of the rams 42 are fully retracted, the contacts 51A of the bottom limit switch 51 are closed and the aforementioned circuit is again made by way of the closed contacts 50, 51A and 62A to re-energise the solenoids of the "up" relay 57 and the valve 54 causing the rams 42 to rise.

The whole sequence of events which has been described above is repeated until a third pair of bales 61, occupying the same disposition relative to the direction 3 as the first pair of bales 49, is lifted by the bale elevating mechanism. The height of the stack of bales is then such that the uppermost first pair of bales 49 turn the arm 61a (FIG. 6) upwardly about pivot 61b and open the stack switch 62. The upper surface of the bales 49 moves from an approximate position 49a to an approximate position 49b (FIG. 6). When a fourth pair of bales 64 (FIG. 6) arrives at the foot of the bale elevating mechanism beneath the elevated bales 49, 59 and 61, it causes the arm 50a to operate the bale probe switch 50 thus closing the contacts thereof which energises the lowering circuit described above. When the three pairs of bales 49, 59 and 61 have been lowered onto the fourth pair of bales 64 and the piston rods of the rams 42 are fully retracted, the bottom limit switch 51 is again operated and completes a circuit via the contacts of the bale probe switch 50, the ram bottom limit switch contacts 51A and stack switch contacts 62B to energise a door release solenoid valve 65 which acts to place a small door release piston and cylinder assembly 67 in communication with the hydraulic pressure duct 55. The piston rod of the door release assembly 67 then advances and operates the door catch. The door or gate 31 at the rear of the bale elevating mechanism is thus unlatched and the ground drag acting upon the fourth pair of bales 64 causes the door or gate 31 to open leaving a stack of four pairs of successively crossed bales standing upon the ground. Opening of the door or gate 31 and release of the stacked bales from the bale elevating mechanism disengages the arm 50a (FIG. 9) from the bale probe switch 50 thus breaking the circuit to the door release solenoid valve 65. The spring-loaded spool of the valve 65 is thus reset and connects the cylinder of the door release assembly 67 to the relief duct 60 as shown in FIG. 7. The piston rod of the assembly 67 retracts into its cylinder under the action of a spring (not shown). The stack switch arm 61a (FIG. 6) which was resting on top of the bales 49 in their position 49c will re-operate the stack switch contacts 62A when the bales move out through the bale retaining gate or door 31. Once the door or gate 31 is clear of contact with the stacked bales, a return spring or other restoring mechanism will re-close the gate which will become latched until the door release valve 65 and assembly 67 are next operated.

The bale retaining gate or door 31 is shown only diagrammatically in the accompanying drawings since its particular construction is by no means critical. It will, however, normally take the form of a substantially uniplanar rigid metallic framework that is turnable, for release purposes, about a substantially vertical axis located alongside one of the rear uprights 37, a return spring, weight or the like being associated with said gate or door 31 in such a way as to close and latch the latter automatically after a stack of bales has been released. The bale stacking sledge which has been described is constructed so as to deal with conventional bales having lengths of substantially 92 centimeters (3 feet) and square cross-sections measuring substantially 46 centimeters (18 inches) in both width and height. Obviously, the sledge could be re-dimensioned to deal with bales of alternative measurements. The bale elevating mechanism at the rear of the sledge is arranged to stack the bales in alternate angularly displaced and angularly undisplaced pairs until stacks of four bales in height (i.e. about 1.84 meters or 6 feet) are formed. Such stacks are convenient for later mechanical handling. However, it is conventional in some areas to form stacks that are only three bales in height (i.e. about 1.38 meters or 4 feet 6 inches) and it is only necessary to re-position the bale top limit switch 62 if such lower stacks are required. In fact, it is preferred that the switch 62 should be capable of being mounted in two alternative positions corresponding respectively to stacks that are four bales and three bales in height so that a user of the bale sledge can adjust it for the desired stack height merely by a simple re-positioning of the switch. It is also preferred that the operator should be able to release a stack of bales, or even a single pair of bales, at any chosen time without waiting for the automatic operation of the gate or door 31. To this end, a pushbutton 69 is preferably provided in the circuit of FIG. 8 in such a position that, upon the closure thereof, current will flow through the door release solenoid valve 65. The pushbutton 69 can be positioned adjacent the driving seat of the operating tractor or other vehicle and be connected to the sledge by flexible electric cables. Over-riding manual control is furnished by providing three pushbutton switches that are conveniently mounted in a control box or panel of the sledge enabling an operator to raise or lower the piston rods of the cylinders 42 or open the gate or door 31 at will. Operating the "up" pushbutton 64 completes a circuit through its contacts 64B and the solenoids of the "up" relay 57 and the valve 54; simultaneously the "up" pushbutton 64 breaks the "down hold" circuit by opening the contacts 64A. The "down" pushbutton 52 operates similarly by way of its contacts 52B in the "down" circuits. A door release pushbutton switch 68 acts in a similar way to the pushbutton 69 and energises the door release solenoid 65 directly.

An important feature of this invention is the fact that the bales which are successively pushed from the chute 4 at a rate of up to 10 bales per minute by the co-operating baling machine are guided into alternate angularly displaced and angularly undisplaced pairs for subsequent stable stacking by the elevating mechanism without the use of electric motors, hydraulic rams or any other similar source of power. Both the path-dividing arm 5 that guides the successive bales into laterally abutting pairs and the bale guiding mechanism that displaces alternate pairs of bales through substantially 90° are operated entirely automatically by the resistance to displacement of the bales relative to the ground surface, the mere progress over the ground in the direction 3 of the sledge being all that is required as a source of energy to operate the two parts of the sledge that have just been mentioned. It is preferred that the bales should make unimpeded direct contact with the ground surface but in certain circumstances it may be desirable that when they reach the bale elevating mechanism they should slide onto a plurality of relatively spaced ground-engaging strips, rods, slats or the like to reduce the frictional engagement between the lower bales and the ground surface. Laterally spaced apart ground-engaging strips, rods, slats or the like may also be provided beneath the path-dividing arm 5 and/or beneath the bale guiding mechanism. However, even when such members are provided, at least some of the bales are in contact with the ground surface during at least part of the formation thereof into stacks during the operation of the sledge.

Although the formation of stable stacks of bales as superposed pairs is a simple and convenient way of dealing with baled hay and other crops, and is similar to the procedure adopted in manual stacking, it is not essential that each layer of the stack should be in the form of a pair of bales and it is noted that it is within the scope of the invention to form bale groups, other than pairs, for superposed stacking with the bales of each layer turned angularly relative to those of the neighbouring layer or layers to provide a stable stack. In particular, the implement may be modified to produce groups of three bales and to stack those bales in alternate angularly displaced and angularly undisplaced layers. It is by no means essential that an implement in accordance with the invention should take the form of a bale sledge arranged to operate in conjunction with a foregoing baling machine. The implement could be provided with ground wheels instead of the runner-like beams 1 and it could be constructed so as to collect from the ground single bales or already formed pairs or other groups of bales for guiding into stacks. Such an implement could, if desired, be self-propelled and would then be provided with an internal combustion engine or like prime mover arranged to generate the necessary electrical energy and hydraulic pressure to operate the bale elevating mechanism. It should, pehaps, be noted that the bale sledge which has been described is provided with auxiliary ground wheels (not shown) that can be brought into operation when the sledge is to be moved from place-to-place without performing any working operation. As mentioned previously, the frame, if articulated, would be locked against articulation at this time.

Instead of using the automatically operating path-dividing arm 5 to form the successive bales into laterally abutting pairs, a leading region of the bale sledge or other form of implement may be provided with a laterally extending roller bed arranged to receive the bales from a baling machine one at a time for lateral displacement over the bed by gravity or power-operated means. A ram or other mechanism would then be provided to push the pairs or other groups of bales off the roller bed in a direction opposite to the direction 3 for delivery by "ground drag" to the bale guiding mechanism of the sledge or other implement.

If desired, an upper region of the bale elevating mechanism could be provided with means for protecting the stacks of bales against inclement weather. There could, for example, be provided a mechanism for folding a sheet of polyethylene or other synthetic plastics material, fed from a supply roll and cut off by a guillotine or the like, around each successive stack of bales and for tying, stitching, clipping or clamping each such protective sheet around substantially all but the lowermost surface of each stack. The polyethylene could be preformed into caps shaped to fit the stacks and, whilst the cost of the protective sheets would be appreciably increased by this measure, such increased cost would be partially offset by the fact that no mechanism would then be required for cutting individual sheets from a roll, folding them to shape and securing them around the individual stacks in one of the ways that has been mentioned above.

It has been emphasised that the automatic operation of parts of the implement merely by the passage thereof over the ground surface without auxiliary power sources is an important feature of the invention that has been described but it is not absolutely essential that both the path-dividing arm 5 and the subsequent bale guiding mechanism (afforded principally by the arms 12 and 13) should be operated solely by the movement of the implement over the ground through the intermediary of the frictional engagement of successive bales with the ground surface. Either or both of the mechanisms that have just been mentioned may, if considered necessary, be provided with hydraulic rams or other power-operated means to assist in displacing the moving parts of either or both of the two mechanisms. Although the use of hydraulic power is clearly a convenient and effective way of operating the bale elevating mechanism of the implement, it is not essential that it should be employed. Compressed air could be used as an alternative or the rams 42 could be replaced by reversible electric or fluid pressure operated motors in combination with lifting winches. Such modifications would entail some alteration to the automatic control arrangement shown diagrammatically in FIGS. 6 to 9 of the drawings, it being possible to employ fluid pressure medium control valves and fluid ducting in place of the electric switches, relays and cables that have been described in outline. With the particular construction which has been described, it is desirable that the double-acting rams 42 should have a vertical stroke of at least 61 centimeters (24 inches) in order that, with conventional bales measuring substantially 46 centimeters (18 inches) in width and height, there will be a clearance of approximately 15 centimeters (6 inches) between the lower surfaces of the lowermost elevated bales and the upper surfaces of the next pair of bales that are received at the foot of the elevating mechanism. A clearance of 15 centimeters (6 inches) or more has been found to be sufficient to compensate for any irregularly formed bales and for any sag of elevated but insufficiently compacted bales.

We claim:

1. A bale stacking implement for attachment to a baler having a bale discharge chute for discharging bales in a substantially rectilinear path, the implement comprising a bale receiving frame elongated in the direction of said path, said frame being open to the ground to permit bales received by the frame to contact the ground and to be caused thereby to pass along the frame during travel of the baler and implement over the ground; first bale guiding means carried by the frame for guiding into groups bales passing along the frame due to their contact with the ground; second bale guiding means actuated by the passage of said groups along the frame due to their contact with the ground to displace angularly through substantially 90° relative to said path alternate ones of said groups; and stacking means to receive and stack in their alternate angularly displaced and angularly un-displaced positions said groups passed thereto due to their contact with the ground.

2. A bale stacking implement according to claim 1, wherein each said group comprises a pair of side-by-side bales, said first bale guiding means comprising a path-dividing arm turnably mounted in said frame, said arm being deflected angularly by contact with successive bales to deflect thereby successive bales to opposite sides thereof and form said groups.

3. A bale stacking implement according to claim 2, wherein said first bale guiding means further comprises an over-center spring acting to urge said arm to each of two angularly displaced positions.

4. A bale stacking implement according to claim 1, wherein each said group comprises a pair of side-by-side bales, said second bale guiding means comprising a pair of rigidly interconnected relatively substantially perpendicular arms turnably mounted in said frame and a bale retaining arm connected to one of said pair of arms, said pair of arms having a condition in which said one of said pair of arms is disposed to be contacted by a group of bales whereby said pair of arms is caused to rotate by the passage of this group and this group is held by said retaining arm in abutment with said one of said pair of arms to remain in substantially fixed position relative thereto during rotation of said pair of arms to be displaced thereby angularly through substantially 90° relative to said path.

5. A bale stacking implement according to claim 4, including means for automatically displacing said bale retaining arm relative to said one of said pair of arms to release said angularly displaced group of bales, and means for automatically restoring the bale retaining arm to its operative bale-retaining position.

6. A bale stacking implement according to claim 4, including means for retaining said pair of arms in predetermined angular settings about an axis until automatic release thereof by abutment with bales.

7. A bale stacking implement according to claim 4, including means for mounting said pair of arms to turn successively through 360°, and a spring to displace said pair of arms through approximately 180° of each complete rotation.

8. A bale stacking implement according to claim 7, including a one-way mechanism to prevent angular displacement of said pair of arms in reverse direction in two different angular settings of said pair of arms.

9. A bale stacking implement according to claim 4, including means for mounting said pair of arms to turn successively through an arc of substantially 180° and then return through this same arc to their initial positions, and a return spring to oppose motion of said pair of arms under the action of said bales.

10. A bale stacking implement according to claim 9, including mean for retaining said pair of arms in one predetermined angular setting and comprising a normally vertical pivoted member engageable by a stop member of one of the arms in an out-of-vertical position to prevent return movement of the arm, the pivoted member assuming its normal vertical position upon onward movement of the arm so as to be free to pivot to permit subsequent return motion of the arm.

11. A bale stacking implement according to claim 1, wherein said stacking means includes bale elevating means for elevating the alternate angularly displaced and angularly undisplaced groups of bales which it receives and lowering the elevated group of bales onto each successive further group of bales to increase the height of the stack from the lower end thereof.

12. A bale stacking implement according to claim 11, wherein the bale elevating means includes fluid pressure operated rams.

13. A bale stacking implement according to claim 12, including a control system having means to release a stack of bales of a predetermined height automatically.

14. A bale stacking implement according to claim 13, wherein said means of said control system is adjustable to enable stacks of bales of different heights to be released automatically.

15. A bale stacking implement for attachment to a baler having a bale discharge chute for discharging bales in a substantially rectilinear path, the implement comprising a bale receiving frame elongated in the direction of said path, said frame being open to the ground to permit bales received by the frame to contact the ground and to be caused thereby to pass along the frame during travel of the baler and implement over the ground; first bale guiding means carried by the frame for guiding into groups bales passing along the frame due to their contact with the ground; second bale guiding means actuated by the passage of said groups along the frame due to their contact with the ground to displace angularly through substantially 90° relative to said path alternate ones of said groups; and stacking means to receive and stack in their alternate angularly displaced and angularly un-displaced positions said groups passed thereto due to their contact with the ground, each said group comprising a pair of side-by-side bales, said first bale guiding means comprising a path-dividing arm turnably mounted in said frame, said arm being deflected angularly by contact with successive bales to deflect thereby successive bales to opposite sides thereof and form said groups; a guide member to retain a first of each said pair of bales in the position into which it is directed by said first bale guiding means until the second of the pair of bales is similarly directed, a part of the guide member being contacted by the second of the pair of bales so that the guide member is moved out of its bale retaining position.

* * * * *